Dec. 27, 1955 — W. W. JONES — 2,728,162
FISHING EQUIPMENT
Filed Sept. 8, 1952
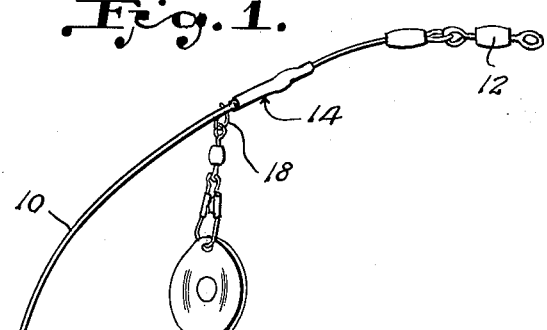
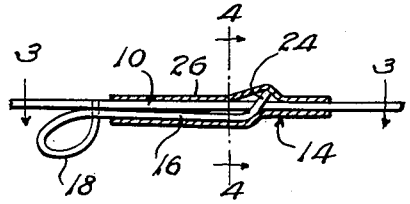
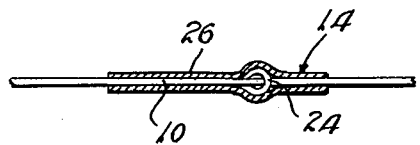
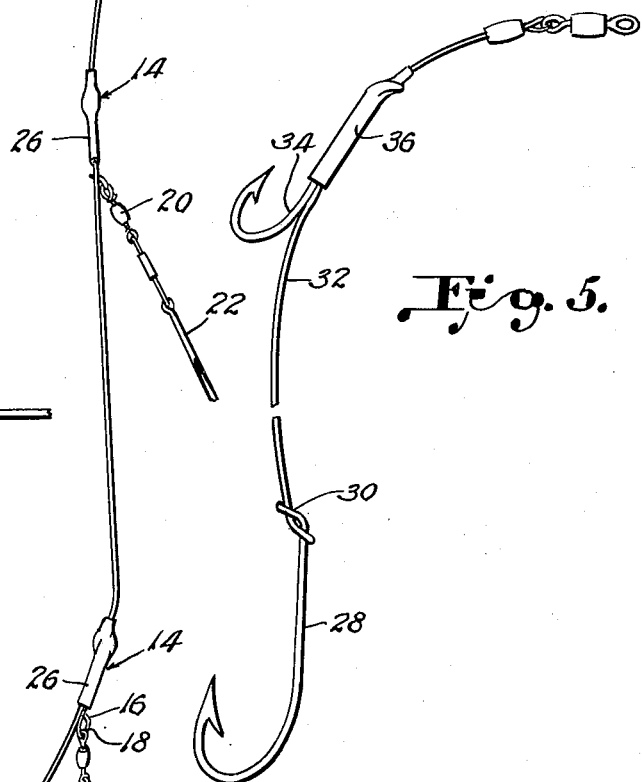
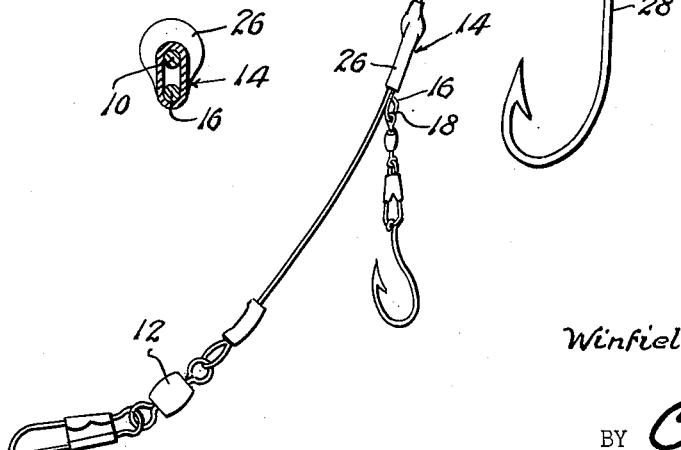
Winfield W. Jones
INVENTOR
BY C. A. Snow & Co.
ATTORNEYS.

United States Patent Office 2,728,162
Patented Dec. 27, 1955

2,728,162

FISHING EQUIPMENT

Winfield W. Jones, Oceanville, N. J.

Application September 8, 1952, Serial No. 308,349

2 Claims. (Cl. 43—44.85)

This invention relates to fishing equipment and has for its primary object to hold one or more fish hooks in a selected position or positions on a leader.

The above and other objects may be attained by employing this invention which embodies among its features a fish hook carrier comprising an elongated shank, a loop or hook carried by the shank and projecting laterally therefrom adjacent one end thereof, an eye carried by the shank and projecting laterally therefrom adjacent the opposite end thereof, said eye projecting in a direction opposite the loop or hook, and a sleeve encircling the leader and the shank, and enclosing the eye to frictionally hold the shank in a selected position on the leader.

In the drawings,

Fig. 1 is a side view of a leader showing this improved fish hook holder connected thereto, Fig. 2 is a fragmentary enlarged side view of the leader showing the fish hook holder thereon and the sleeve, in longitudinal section, Fig. 3 is a longitudinal sectional view taken substantially along the line 3—3 of Fig. 2, and Fig. 4 is a transverse sectional view taken substantially on the line 4—4 of Fig. 2 and Fig. 5 is a side view of a tandem fish hook arrangement in which one of the hooks is adjustably connected to a leader.

Referring to the drawings in detail a leader 10 of a suitable flexible material is provided at opposite ends with conventional swivels 12 by means of which the leader may be attached to an end of a conventional fishing line and on other fishing equipment.

Mounted on the leader for longitudinal adjustment thereon are fish hook holders designated generally 14 each of which comprises an elongated shank 16 carrying at one end a loop or hook 18 which extends laterally therefrom and to which may be attached conventional swivels 20 and fasteners 22 for coupling fish hooks or the like to the shank 16. Carried by the shank adjacent the end thereof remote from the loop 18 is an eye 24 which extends laterally from the leader in a direction opposite the loop 18 and the axis of the eye lies at an acute angle to the longitudinal axis of the leader as will be readily understood upon reference to Fig. 2. A sleeve 26 encircles the leader 10 and the shank 16 and encloses the eye 24 to frictionally hold the shank against the leader so that the shank may be moved longitudinally along the leader but will remain in a selected position thereon unless definite effort is exerted on the shank to move it longitudinally along the leader.

In the preferred form of the invention the sleeve 26 is formed of a suitable plastic material which may be rendered flexible and expansible upon impregnation with a suitable liquid vehicle so that in placing the sleeve over the leader, shank, and eye, it may be molded around the eye as suggested in Figs. 2, 3 and 4 and when dried will remain in the configuration substantially illustrated in the drawings.

In use the shanks 16 carrying their loops or hooks 18 may be moved longitudinally along the leader to selected positions, as suggested in Fig. 1 and will remain in those positions until such time as definite effort is exerted to move them to other positions on the leader.

Obviously if so desired, the shank of a conventional fish hook may be secured directly to the leader as previously described and the fish hook may be moved to selected positions on the leader.

In the modified form of the invention, a conventional fish hook 28 having an eye 30 is connected to one end of a leader 32 upon which is mounted for adjustment longitudinally a fish hook 34 held in frictional contact with the leader 32 by a sleeve 36 which corresponds in all respects to the sleeve 26, it being understood that the eye of the fish hook 34 encircles the leader 32 and is enclosed by the sleeve 36 as previously described.

The sleeves illustrated are of the thermoplastic class and type of plastics. The dilator solution can vary as to chemical analysis, this being any solution which can act upon a thermoplastic to which it is applied in a manner to permit said thermoplastic to stretch after which a desired degree of contraction sets in when the solution dries, which will cause the sleeves to be normally held against movement longitudinally of their supporting member, but allowed to slide on the supporting member on which it is used under excessive strain directed thereto. It has been found that a solution of the type marketed by the General Electric Company, Schenectady, New York, under the name "Service Solvent" is well suited for this purpose.

While in the foregoing there has been shown and described the preferred embodiment of this invention it is to be understood that minor changes in the details of construction combination and arrangement of parts may be resorted to without departing from the spirit and scope of the invention as claimed.

What is claimed is:

1. In fishing equipment of the kind described, a fish hook carrier comprising an elongated substantially rigid shank, a hook on one end of said shank extending laterally therefrom, an eye on the other end of said shank extending laterally therefrom in inclined relation to said shank, an elongated member extending adjacent to said eye and in substantially parallel relation with the shank, and a plastic sleeve encircling said eye, a portion of said shank and an adjacent portion of the length of said number for frictionally and slidably holding said shank in a selected position on said member.

2. In fishing equipment of the kind described, a fish hook carrier comprising an elongated substantially rigid shank, a hook on one end of said shank extending laterally therefrom, an eye on the other end of said shank extending laterally therefrom in inclined relation to said shank, an elongated flexible member extending adjacent to said eye and in substantially parallel relation with the shank, a plastic sleeve encircling said eye, a portion of said shank and an adjacent portion of the length of said elongated flexible member for frictionally and slidably holding said shank in a selected position on said flexible member.

References Cited in the file of this patent

UNITED STATES PATENTS

| | | |
|---|---|---|
| 1,156,152 | Krenrick | Oct. 12, 1915 |
| 1,307,411 | Moore | June 24, 1919 |
| 2,485,812 | Buccilli | Oct. 25, 1949 |
| 2,577,466 | Jones | Oct. 12, 1951 |
| 2,636,307 | Mason et al. | Apr. 28, 1953 |

FOREIGN PATENTS

| | | |
|---|---|---|
| 979,089 | France | Apr. 23, 1951 |